US012350859B2

(12) United States Patent
Toncelli

(10) Patent No.: US 12,350,859 B2
(45) Date of Patent: Jul. 8, 2025

(54) METHOD, ROBOT ISLAND AND APPARATUS FOR MANUFACTURING SLABS MADE OF CONGLOMERATE OF STONE AND/OR CERAMIC MATERIAL WITH VEINED EFFECT

(71) Applicant: Luca Toncelli, Bassano del Grappa (IT)

(72) Inventor: Luca Toncelli, Bassano del Grappa (IT)

(73) Assignee: Luca Toncelli, Bassano del Grappa (IT)

(*) Notice: Subject to any disclaimer, the term of this patent is extended or adjusted under 35 U.S.C. 154(b) by 537 days.

(21) Appl. No.: 17/298,470

(22) PCT Filed: Dec. 3, 2019

(86) PCT No.: PCT/IB2019/060381
§ 371 (c)(1),
(2) Date: May 28, 2021

(87) PCT Pub. No.: WO2020/115644
PCT Pub. Date: Jun. 11, 2020

(65) Prior Publication Data
US 2022/0097258 A1 Mar. 31, 2022

(30) Foreign Application Priority Data
Dec. 5, 2018 (IT) ........................ 102018000010813

(51) Int. Cl.
*B28B 1/00* (2006.01)
*B28B 13/02* (2006.01)

(52) U.S. Cl.
CPC .......... *B28B 1/005* (2013.01); *B28B 13/0295* (2013.01)

(58) Field of Classification Search
CPC . B28B 1/005; B28B 13/0295; B28B 13/0205; B28B 13/021
See application file for complete search history.

(56) References Cited

U.S. PATENT DOCUMENTS

2004/0032044 A1 2/2004 Toncelli
2008/0296795 A1 12/2008 Willis-Papi
(Continued)

FOREIGN PATENT DOCUMENTS

EP 0586257 A2 3/1994
WO 2005090034 A1 9/2005
(Continued)

OTHER PUBLICATIONS

PCT International Search Report and Written Opinion dated Apr. 7, 2020 for Intl. App. No. PCT/IB2019/060381, from which the instant application is based, 11 pgs.
(Continued)

*Primary Examiner* — Virak Nguon
(74) *Attorney, Agent, or Firm* — Fredrikson & Byron, P.A.

(57) ABSTRACT

Method for manufacturing automatically slabs of conglomerate stone and/or ceramic material with a veined effect from a base mix (M), which method comprises a step of a) depositing a layer of base mix (M) inside a temporary support (S), (b) automatically forming on the layer of base mix (M) at least one plurality of grooves (F) of predetermined width, c) automatically distributing at least one dye inside the grooves (F) and d) compacting the layer of base mix (F). The at least one dye consists of a colouring mix (C1, C2) comprising at least one binder. The invention also relates to a robot island (1) for forming veining in a layer of base mix (M) for the manufacture of slabs and an apparatus for manufacturing slabs with a veined effect.

22 Claims, 5 Drawing Sheets

(56) References Cited

U.S. PATENT DOCUMENTS

| | | | |
|---|---|---|---|
| 2010/0052225 A1 | 3/2010 | Toncelli | |
| 2010/0159220 A1* | 6/2010 | Toncelli | B28B 1/005<br>428/210 |
| 2010/0194005 A1 | 8/2010 | Toncelli | |
| 2011/0318483 A1 | 12/2011 | Toncelli | |
| 2017/0355101 A1 | 12/2017 | Toncelli | |
| 2018/0126673 A1* | 5/2018 | Sanchis Brines | B44C 5/0453 |
| 2021/0229313 A1* | 7/2021 | Rodriguez Garcia | B28B 3/02 |

FOREIGN PATENT DOCUMENTS

| | | |
|---|---|---|
| WO | 2006084792 A1 | 8/2006 |
| WO | 2016113652 A1 | 7/2016 |
| WO | 2016123433 A1 | 8/2016 |
| WO | 2016189377 A1 | 12/2016 |
| WO | 2019101823 A1 | 5/2019 |

OTHER PUBLICATIONS

Italian Search Report and Written Opinion, with English translation, dated Sep. 11, 2019 for related Italian Application No. 102018000010813, 8 pgs.
Third Party Observation for Application No. EP19832200.0 EP3890933, dated Mar. 3, 2022, 67 pages.

* cited by examiner

METHOD, ROBOT ISLAND AND APPARATUS FOR MANUFACTURING SLABS MADE OF CONGLOMERATE OF STONE AND/OR CERAMIC MATERIAL WITH VEINED EFFECT

RELATED APPLICATIONS

This application is a 35 U.S.C. 371 national stage filing from International Application No. PCT/IB2019/060381, filed Dec. 3, 2019, which claims priority to Italian Application No. 102018000010813, filed Dec. 5, 2018, the teachings of which are incorporated herein by reference.

The present invention relates to the formation of veining in slabs, preferably made of conglomerate stone and/or ceramic material.

The present invention relates firstly to a method for manufacturing slabs of conglomerate stone and/or ceramic material with a veined effect.

Secondly the present invention relates to a robot island for the formation of veining in a base mix for manufacturing slabs of conglomerate stone and/or ceramic material.

Thirdly the invention relates to an apparatus for manufacturing slabs of conglomerate stone and/or ceramic material with a veined effect.

The technology for the manufacture of slabs of conglomerate stone and/or ceramic material has been known for long time; the most well-known technology is called Bretonstone® or Lapitec® technology. For a description of these technologies reference may be made, for example, to the documents IT1328246 and IT1380856.

In connection with these technologies, machines comprising a mix weighing distributor provided with at least one dispenser of dye for producing slabs with a veined effect from a base mix, have also been known for a long time.

The weighing distributor comprises a hopper designed to contain the mix and having an outlet opening for discharging the mix onto an extractor belt. The latter is designed to move and pour the mix inside a temporary support performing a relative movement with respect to the distributor.

One or more dye dispensers are positioned above the extractor belt so as to distribute one or more liquid or powder dyes on the mix before the latter is poured inside the support.

Examples of these machines are known from IT1380651 and IT1393456 in the name of the same proprietor of the present application. These machines, although they are widely established in the sector, have a number of drawbacks which have not been solved hitherto.

For example, a first drawback consists in the fact that the distribution of the dye occurs randomly and therefore also the final veined effect is random. This drawback makes it impossible to obtain slabs having a veined effect with a specific design.

A further drawback consists in the fact that these machines do not allow the formation of veining of variable length, i.e. from a few centimetres to several metres, nor a stain-like pattern, where predefined areas of the slab have colour shading or hues different from the remainder of the slab.

In order to overcome at least partially these drawbacks, robot machines for the formation of veining in a base mix, for example of the type described in the patent IT1428343 in the name of the same proprietor of the present application, have been developed.

In an apparatus for the production of slabs of conglomerate stone and/or ceramic material from a base mix, this type of machine may be installed downstream of a station or machine for distributing the mix in the temporary support and upstream of a station or machine for compaction, for example by means of vacuum vibro-compression of the mix contained in the support.

The machine in question comprises at least one pair of anthropomorphic arms, each of which has, mounted thereon, a head with a rotating spindle and a device for dispensing dye, both in powder form and in liquid form.

Alternatively the anthropomorphic arms may be replaced by Cartesian robots, namely robots movable along Cartesian axes. In this embodiment the machine, has, on each of the longitudinal sides, a pair of uprights with a longitudinal travel way and a pair of transverse beams mounted slidably on the travel ways and movable above the support containing the mix.

On each beam a head of the type described above with reference to the first embodiment is slidably mounted.

The dispensing device consists of a hopper with an opening designed to be selectively closed by a closing member when the dye is in powder form or by a nozzle designed to spray a liquid colouring agent.

Moreover, one or more tools for working the mix may be mounted on at least one of the heads, in particular on the rotating spindle. For example, these tools may comprise a ploughshare or plower designed to form grooves in the thickness of the mix, or a stirrer or wand suitable for mixing the mix.

The ploughshare tool is used to form grooves in which the dye may be subsequently distributed, while the stirrer is used to mix up the base mix after the dye has been distributed so as to form areas with different colour or shades.

The machine is managed by a control unit designed to control the movement of the arms, or beams, along predetermined trajectories so as to prevent them colliding.

The dispensing devices are supplied by one or more storage tanks which may contain different liquid dyes or by a supply duct which is branched off along the robotic arms.

In addition, one or more fixed hoppers for storing dyes in powder form may be provided in order to feed the hopper of each dispensing device. Moreover, the machine may comprise a station for depositing the tools when they are not mounted on the heads.

A first drawback of this solution consists in the fact that the machine does not allow the formation of veins with large widths, for example a few centimetres wide, while having a markedly different colour from the base mix.

A further drawback of this solution consists in the fact that the width of the veins may very only within a limited range of values, usually between 2 mm and 20 mm.

The main object of the present invention is to provide a robot island for the formation of veining in a base mix and an apparatus and a method for the production of slabs of conglomerate stone and/or ceramic material with a veined effect from a base mix, which are able to overcome the aforementioned drawbacks.

A particular task of the present invention is to provide a method and an apparatus for the automatic production, without human intervention, of slabs of conglomerate stone and/or ceramic material which are able to provide veining with a length and width greater than those of the slabs manufactured automatically hitherto.

A further task of the present invention is to provide a method and a robot island of the type described above, which are able to provide veining with a predetermined pattern automatically.

A further task of the present invention is to provide a method and a robot island of the type described above, which are able to provide veining with variable-width spacing automatically.

A further task of the present invention is to provide a method and a robot island of the type described above, which are able to provide veining with different colouring automatically.

Another task of the present invention is to provide an apparatus for automatically manufacturing slabs of conglomerate stone and/or ceramic material which have veining with a width and length greater than those of the slabs manufactured hitherto automatically.

The object and main tasks described above are achieved with a method and an apparatus for manufacturing slabs with a veined effect, and with a robot island for the formation of veining in a base mix for the manufacture of slabs made of conglomerate stone and/or ceramic material, each according to the claims herein.

In order to illustrate more clearly the innovative principles of the present invention and its advantages compared to the prior art, an example of embodiment will be described below with the aid of the accompanying drawings. In the drawings.

Figure 1:
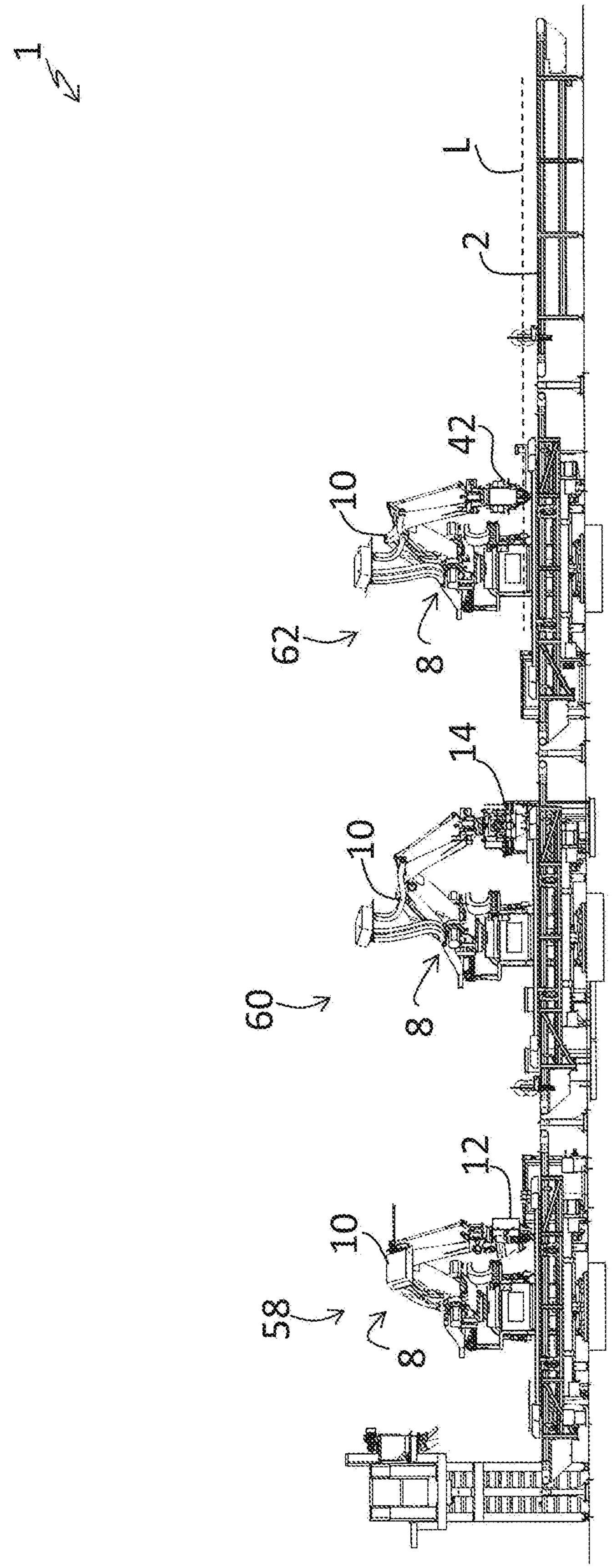
FIG. 1 shows a side view of the robot island for the formation of veining in a base mix for the manufacture of slabs according to the present invention.
Figure 3A:
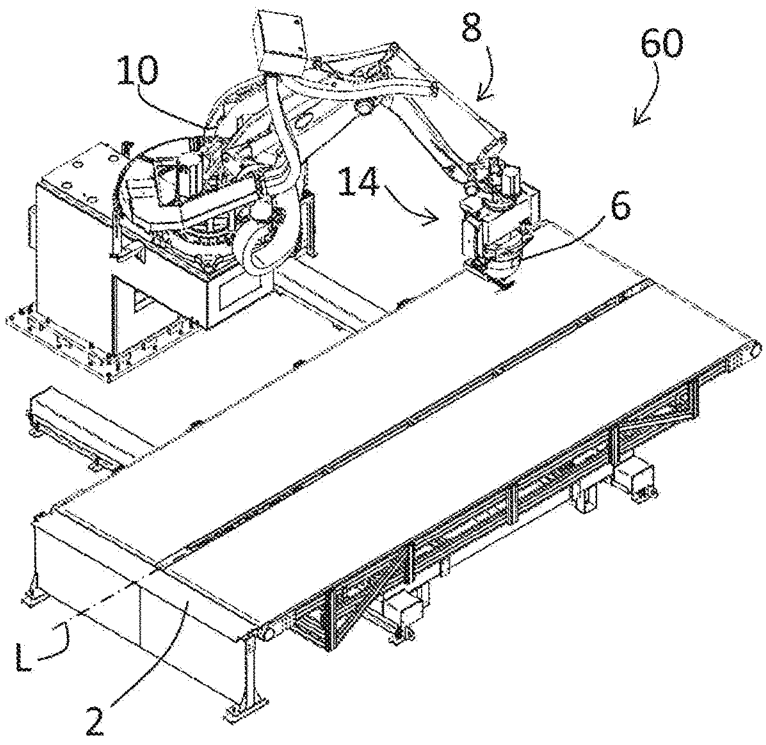
Figure 3B:
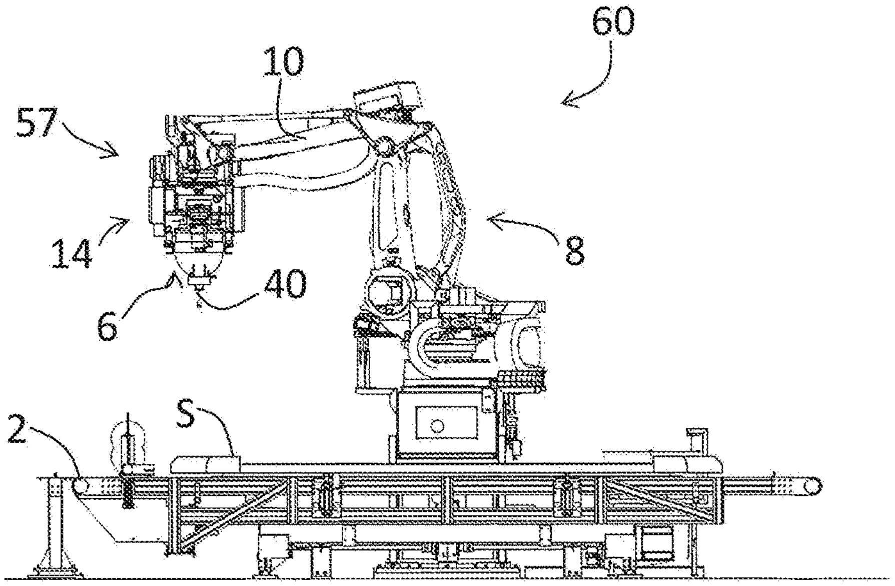
Figure 4:
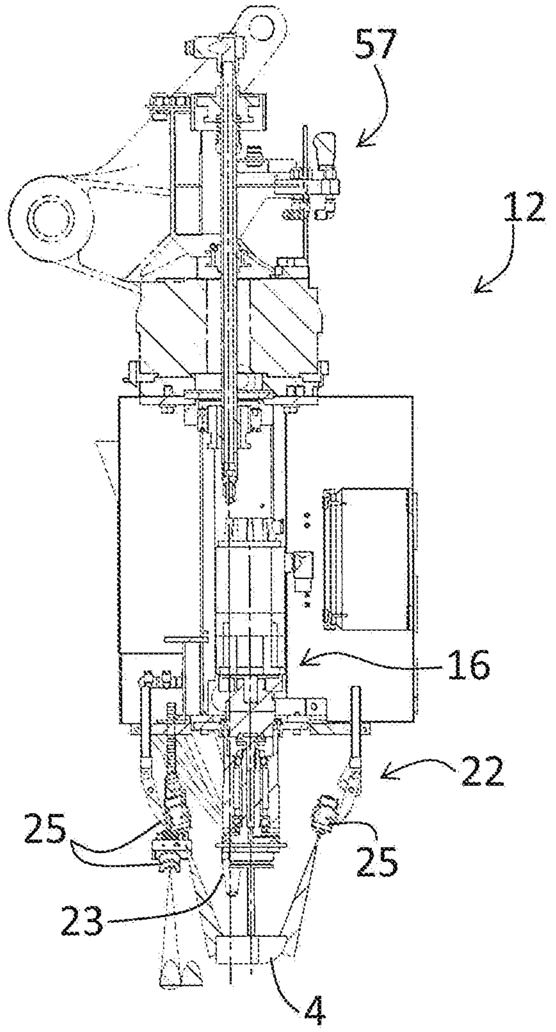
Figure 5:
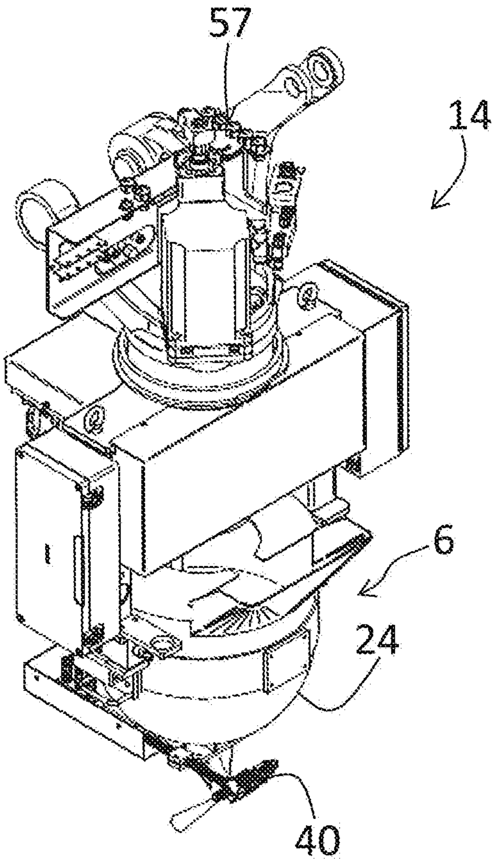
Figure 6:
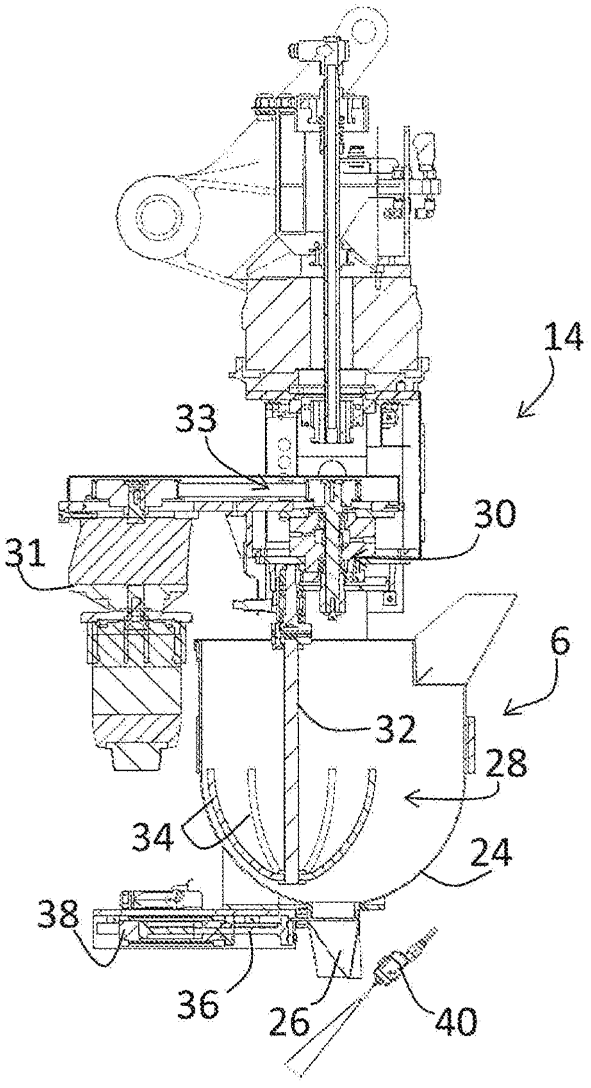
Figure 7:
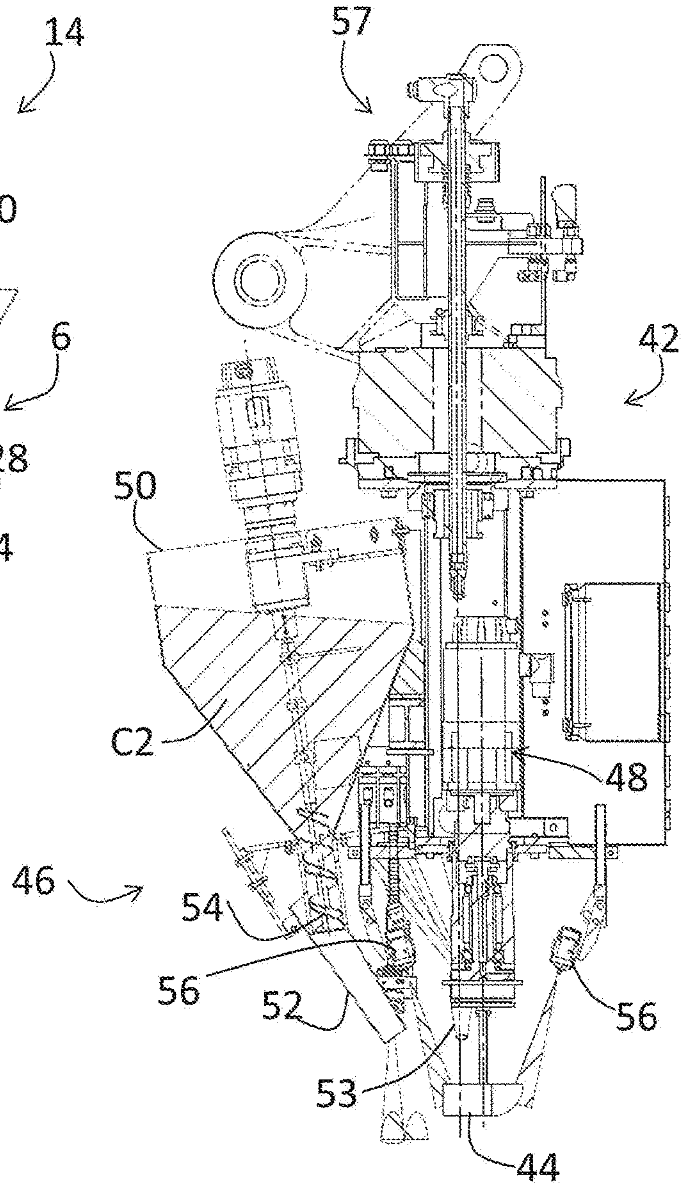

FIGS. 3*a* and 3*b* show respectively a perspective view and a front view of a machine of the robot island according to FIG. 1;

FIG. 4 shows a partially cross-sectioned front view of a first working head of the robot island according to FIG. 1;

FIG. 5 shows a perspective view of a second working head of the robot island according to FIG. 1;

FIG. 6 shows a cross-sectioned front view of the working head according to FIG. 5;

FIG. 7 shows a cross-sectioned front view of a third working head of the robot island according to FIG. 1.

Before illustrating in detail the method according to the present invention, for the purposes of an easier and more logical description, a preferred embodiment of the robot island according to the present invention will be firstly described.

With reference to the figures, the reference number 1 denotes overall a robot island for the formation of veining in a base mix M for the manufacture of slabs of conglomerate stone and/or ceramic material.

Advantageously, the robot island 1 is designed to be installed in an apparatus, not shown in the figures since widely known to the person skilled in the art, for manufacturing slabs with a veined effect from a base mix.

In particular, the slabs are obtained from a layer of base mix M distributed inside a temporary support S which is moved inside the apparatus.

The base mix M preferably comprises a binder, granules of inert material and/or a filler.

Suitably, in the apparatus for manufacturing slabs, the island 1 for the formation of the veining is situated downstream of a machine for distribution of the layer of mix M in the temporary support S and upstream of a machine for compaction, preferably vacuum vibro-compression, of the mix M contained in the support S and having the veining.

The machines or stations for distribution of the mix and for compaction, preferably for vibro-compression, are of the type known per se and will not be further described below.

The apparatus comprises a line for transporting the temporary support S containing the mix M along a feeding direction L and through the aforementioned machines.

Preferably, said transportation line comprises a plan 2 for supporting and moving the support S containing the mix M along a feeding direction L inside the island 1. The movement plan 2 may be provided with a conveyor belt for feeding the support S.

Furthermore, the robot island 1 comprises at least one tool 4, 44 designed to form one or more grooves F1,F2 in the layer of base mix M and at least one dispensing device 6, 46 for distributing a dye inside the grooves F1, F2 which has been previously formed. The at least one tool 4, 44 is shown in FIGS. 4 and 7, while the at least one dispensing device is shown in FIGS. 3*a*-3*b* and in FIGS. 5 to 7.

Also provided are movement means 8 associated with the at least one tool 4, 44 and the at least one dispensing device 6, 46 for the relative movement thereof above the movement plan 2.

In particular, the tool 4, 44 and the dispensing device 6, 46 are designed to be moved along predetermined trajectories so as to reach each point of the movement plan 2 and therefore the support S.

These movement means 8 may comprise at least one anthropomorphic robot 10, as shown in FIGS. 1-3*b*, or alternatively at least one Cartesian robot, of the type known per se and not shown in the figures.

In accordance with the present invention and unlike the prior in which a dye, which may be solid (in powder form) or liquid, is distributed in grooves provided for this purpose, the dispensing device is designed to distribute at least one colouring mix C1, C2 inside the grooves F1, F2.

Therefore, the dye distributed inside the grooves F1, F2 by the dispensing device 6, 46 is at least one colouring mix C1, C2.

In a manner similar to the base mix M, the colouring mix C1, C2 comprises at least one binder.

The use of this mix C1, C2 allows the formation in the slabs of veining with a larger width than the veining formed in the slabs of the prior art.

Advantageously, the island 1 comprises at least one pair of working heads 12, 14 which are mounted on the movement means 8, wherein a first head 12 has the tool 4 for forming the grooves F1 in the base mix M and the second head 14 comprises the dispensing device 6.

Figure 2:
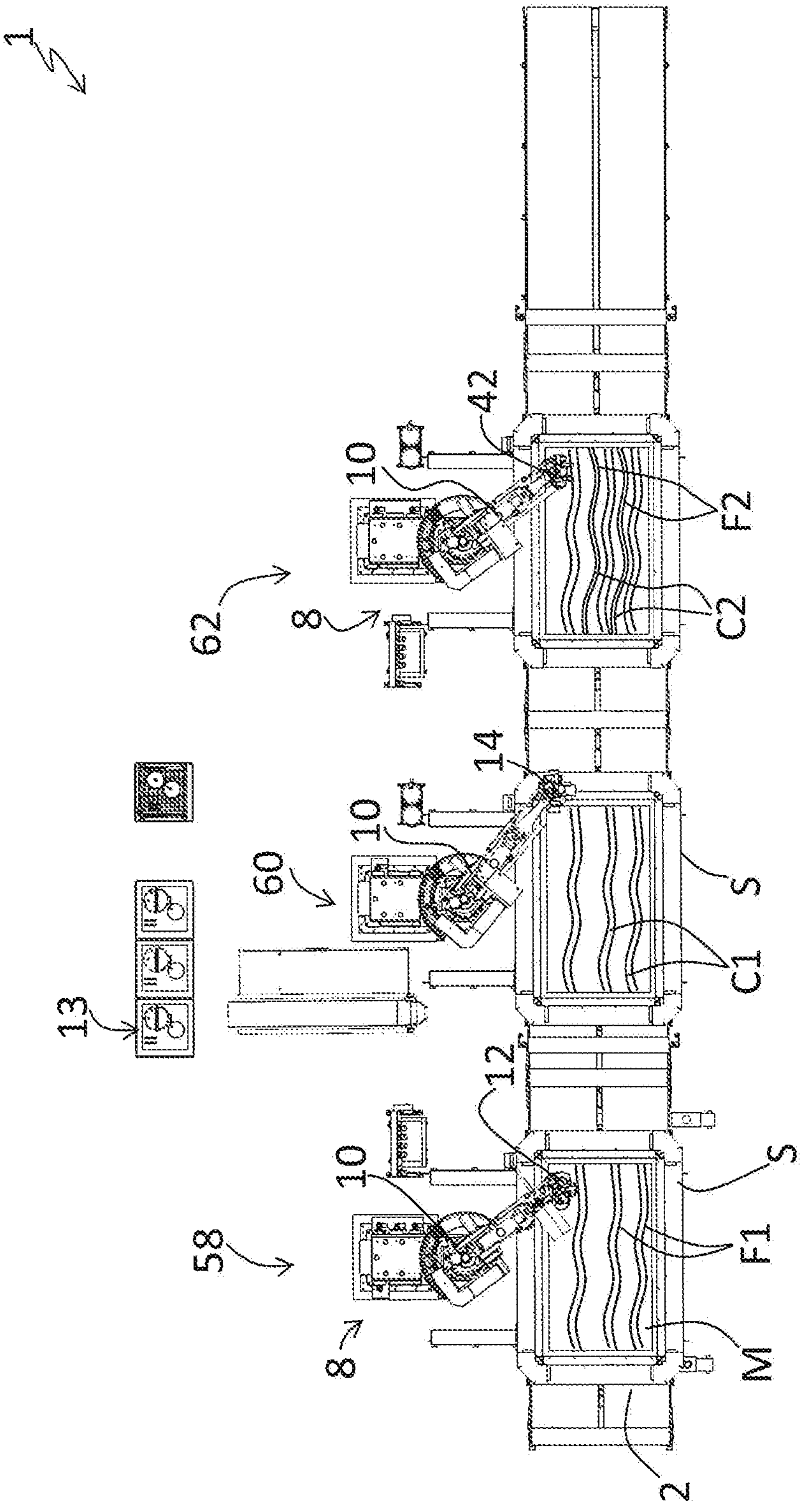
FIG. 2 shows a top plan view of the robot island according to FIG. 1.

The first head 12 is shown in FIGS. 1, 2 and 4, while the second head 14 is shown in FIGS. 1-3*b* and 5-6. The heads 12, 14 are preferably connected to a control unit 13 designed to cause the displacement thereof along predetermined trajectories by means of the movement means 8.

The first head 12 and the second head 14 may be mounted on respective anthropomorphic arms 10 of the movement means 8, as shown in the figures. The arms 10 are designed to move the heads 12, 14 independently of each other.

Alternatively, the heads 12, 14 may be mounted interchangeably on a single anthropomorphic arm 10.

Preferably, as shown in FIG. 4, the tool 4 for forming the grooves F1 is a tool with a varyingly shaped ploughshare. However, the ploughshare tool 4 may also be replaced by a different tool, for example of the disk type or roller wheel type, having the same function of forming the grooves F1.

The ploughshare tool 4 is mounted on the bottom end of a motorized vertical rotating spindle 16 and may have a predetermined thickness.

When the width of the grooves F1 to be formed is greater than the thickness of the tool 4, the latter may be made to oscillate by means of rotation of the spindle 16 alternately in one direction and the other, so as to vary the width of the grooves F1, or by means of a winding advancing movement of the head.

The oscillating movement of the tool 4 may also be performed by means of oscillation of the articulation or pulse of the anthropomorphic arm 10 on which the first head 12 is mounted. The articulation of the anthropomorphic arm 10 allows the tool 4 to have a controlled axis which is inclined with respect to the vertical direction.

The ploughshare tool 4 allows first grooves F1 to be formed in the thickness of the layer of mix M, as shown in FIG. 2. The first grooves F1 have a first width ranging preferably between 2 cm and 7 cm, formed in the free surface of the base mix M.

The first head 12 may also comprise an associated dispensing device 22 for applying a liquid dye and/or a powder dye onto the side walls of the first grooves F1 formed by the ploughshare tool 4, as shown in FIG. 4, before the colouring mix C1 is distributed inside them. The liquid dye and/or powder dye is different from the first mix C1.

The dispensing device 22 of the first head 12 comprises means 23 for dispensing a powder dye and a plurality of nozzles 25 for dispensing a liquid dye.

Instead, in this embodiment, the dispensing device 6 of the second head 14 may comprise a container 24 with a bottom outlet opening 26 for distribution of a first colouring mix C1 by means of gravity into the first grooves F1 formed beforehand, as shown more clearly in FIGS. 3*a*-3*b* and 5-6.

The outlet opening 26 may have a calibrated cross-section of suitable diameter, for example of between 40 and 80 mm, more preferably between 50 and 60 mm.

Preferably the container 24 has a hemispherical base designed to contain a quantity of colouring mix C1 sufficient for filling one or more supports S. By way of example said quantity is in the range of 15-40 kg, preferably 20-30 kg.

Said dispensing device 6 may comprises a scraper/pusher element 28 positioned inside the container 24 so as to assist expulsion with a constant flowrate of the first colouring mix C1 from the outlet opening 26.

The scraper element 28 may be mounted on a respective motorized spindle 30 having an epicycloidal movement. The spindle 30 is connected to respective motor means 31 via known transmission means 33, as shown in FIG. 6.

The scraper element 28 consists preferably of a vertical stem 32 with a plurality of curved arms 34 which extend from the bottom end of the stem 32 upwards, following the internal shape of the container 24, as shown in FIG. 6.

By way of example, the speed of rotation of the vertical spindle 30 may be adjusted to 15-40 rpm, preferably 18-28 rpm, so as to ensure a constant outflow of the first colouring mix C1 in the region of 400-500 g/s.

The first colouring mix C1 has a content of binder similar to that of the base mix M, but a different colouring so that, given the paste-like consistency of the first colouring mix C1, preferably the scraper element 28 acting inside the container 24 is provided.

The dispensing device 6 of the second head 14 also comprises a closing member 36 connected to a pneumatic actuator 38 and positioned at the outlet opening 26 so as to close it off selectively, as shown in FIG. 6.

When it is required to proceed with filling of the first grooves F1, the container 24 is firstly filled with the first colouring mix C1 containing the necessary quantity of binder for the following compaction step; then the closing member 36 is operated so as to open the outlet opening 26 and, at the same time, the scraper element 28 is operated in order to ensure expulsion of the first colouring mix C1 with the desired flow.

The anthropomorphic arm 10 of the second head 14 follows trajectories programmed by the control unit 13 with suitable speeds of advancing movement and the flowrate of the colouring mix C1 is chosen so as to ensure suitable filling of the first grooves F1 depending on their form and width.

Alternatively, the container 24 of the second head 14 may be continuously fed by means of supply lines connected to hoppers with a predetermined capacity, not shown in the figures.

Moreover, the second head 14 may comprise a nozzle 40, shown in FIGS. 5 and 6, positioned at the outlet opening 26 and designed to dispense a liquid dye onto the first colouring mix C1 before distribution of the latter inside the first grooves F1.

The liquid dye sprayed from the nozzle 40 may be used to obtain particular varied streaking effects on the first colouring mix C1 and a corresponding effect in the veining of the finished slab.

According to a further embodiment, a third working head 42 which comprises the at least one tool 44 for forming the grooves and the at least one dispensing device 46 may be provided. This working head 42 is shown more clearly in FIG. 7 and below it will be referred to as third head of the robot island 1.

The third head 42 is also connected to the control unit 13 and is designed to be moved along predetermined trajectories by the movement means 8.

In this embodiment, the tool 44 for forming the grooves is similar to that of the first head 12 and is a ploughshare tool. This ploughshare tool 44 is mounted on a respective vertical rotating spindle 48 connected to motor means and is designed to form second grooves F2 (shown in FIG. 2) having a second width of between 2 and 20 mm, namely a width smaller than that of the grooves F1 which can be obtained with the tool 4 of the first head 12.

The dispensing device 46 of the third head 42 may comprise a hopper 50 and a discharge duct 52 inside which a rotating feeder screw 54 is housed, as shown in FIG. 7.

The dispensing device 46 is designed to distribute a further colouring mix C2 different from the first colouring mix C1, into the second grooves F2, as shown in FIG. 2.

In particular, this colouring mix C2 comprises a smaller quantity of binder than the first colouring mix C1 and the base mix M, and has a different colour from the latter; the smaller quantity of binder makes the mix more friable and able to flow more easily in order to fill the narrower grooves.

The particular nature of this colouring mix C2 makes it particularly suitable for being distributed inside the second grooves F2 formed by the ploughshare tool 44 of the third head 42.

From the above description, it is clear that the dispensing device 6, 46, both of the second head 14 and of the third head 42, must necessarily comprise an element for containing the colouring mix C1, C2, namely the container 24 or the hopper 50, and an opening for the distribution by means of gravity of the colouring mix C1, C2, namely the outlet opening 26 or the discharge duct 52.

Advantageously, the third head 42 may comprise at least one nozzle 56, preferably two nozzles, for dispensing a liquid dye and/or a liquid binder onto the layer of colouring mix C2 which is discharged from the discharge duct 52 and means for dispensing a dye in powder form 53, as shown in FIG. 7.

The liquid binder is sprayed so that the colouring mix C2 has at the end a binder content similar to that of base mix M and the first colouring mix C1.

In the figures attached to the present application, the island 1 therefore comprises three working heads 12, 14, 42 which correspond to the first, second and third head described above.

The second head 14 is positioned downstream of the first head 12 along the direction of feeding L of the support S and the third head 42 is positioned downstream of the second head 14 with respect to the feeding direction L.

In this embodiment, the grooves F with a width smaller than 2 mm may be formed both by the ploughshare tool 4 of the first head 12 and by the tool 44 of the third head 42.

Moreover, each of the heads is positioned in a respective first 58, second 60 and third robotized processing machine 62 and is connected to the control unit 13, as shown in FIGS. 1 and 2. The control unit 13 is designed to control the movement of the heads along predetermined trajectories by means of the movement means 8.

In particular, the control unit 13 is configured to move, in succession, the first head 12 and the second head 14 along the same trajectories so as to fill all the first grooves F1 created by the first head 12 with the first colouring mix C1 distributed by the second head 14. The third head 42 may also be moved along trajectories different from those of the first head 12 and the second head 14.

Preferably, each machine 58, 60, 62 comprises a respective anthropomorphic arm 10 on which the respective head 12, 14, 42 is mounted. In the attached figures the anthropomorphic arms 10 are positioned along the same longitudinal side of the movement surface 2. However, they may also be positioned transversely staggered along the feeding direction L.

The heads 12, 14, 42 are mounted on the bottom end of the anthropomorphic arms 10 by mounting means 57 of the type known per se which will not be further described below.

Alternatively, a robot island 1 comprising only the first head 12 and the second head 14 with the respective tool 4 and the dispensing device 6, or only the third head 42 comprising the ploughshare tool 44 and the dispensing device 46, may be provided.

According to an alternative embodiment not shown in the Figures, a single processing machine with a single anthropomorphic arm 10 and the first head 12, second head 14 and third head 42 may be interchangeably mounted on the single anthropomorphic arm 10.

The present invention relates furthermore to a method for the production automatically, namely with intervention by an operator, of slabs of conglomerate stone and/or ceramic material with a veined effect from a base mix M; the method may be implemented by means of the robot island 1 and the apparatus described above.

The method comprises the steps of a) depositing a layer of base mix M in a temporary support S, b) automatically forming in the layer of mix M one or more grooves F1, F2 with a predetermined width, c) automatically distributing a dye inside the grooves F1, F2 and d) compacting the layer of base mix M.

In accordance with the present invention, the dye used for filling the grooves F1, F2 is at least one colouring mix C1, C2 of the type described above containing a binder.

In particular, the colouring mix corresponds to the first colouring mix C1 containing a large amount of binder content when the step c) is performed by the dispensing device 6 of the second head 14 after the first grooves F1 with a width of between 2 cm and 7 cm have been formed with the first head, or to the colouring mix C2 containing a small amount of binder when the step c) is performed by the dispensing device 46 of the third head 42 after the second grooves F2 with a width not greater than 20 mm have been formed.

Preferably, the method may involve both the distribution of the first colouring mix C1 and then the distribution of the additional colouring mix C2.

Furthermore, the step b) may involve the formation of a plurality of first grooves F1 with a predetermined width (usually between 2 cm and 7 cm) and a plurality of second grooves F2 with a width smaller than the predetermined width (usually smaller than 2 cm).

As described above, the first grooves F1 may be formed by means of the tool 6 of the first head 12 and the second grooves F2 may be formed using the tool 44 of the third head 42.

Advantageously, the first colouring mix C1 may be distributed inside the first grooves F1 and the additional colouring mix C2 may be distributed inside the second grooves F2, as shown in FIG. 2.

The method may also comprise an optional step of applying a liquid and/or powder dye onto the side walls of the first grooves F1 formed upstream of the step c), with a colour different from that of the base mix. This step may be performed by the first head 4 described above.

From the description above it is now clear how the island, the method and the apparatus for forming the veining effects in a base mix are able to achieve the predefined objects in an advantageous manner. In particular, it is clear how with the island it is possible to form veining in the base mix having a particularly large thickness and width.

In fact, as a result of the distribution of the colouring mix saturated with binder by the second head 14 in the grooves F1, it is possible to form thick veins in which the colouring differs clearly from the colouring of the base mix. Furthermore, with the robot island according to the present invention it is possible to form veining of varying thickness and with different colouring owing to the presence of the three working heads.

The characteristic features of the various solutions shown here may be combined with each other according to specific needs and wishes, as may be easily imagined by the person skilled in the art.

The invention claimed is:

1. A method for manufacturing automatically, without human intervention, slabs of conglomerate stone and/or ceramic material with a veined effect from a base mix, comprising following steps:

(a) depositing a layer of base mix inside a temporary support;

(b) automatically forming in said layer of base mix one or more grooves with a predetermined width;

(c) automatically distributing a dye inside the one or more grooves;

(d) compacting the layer of base mix;

characterized in that said dye consists of at least one colouring mix comprising at least one binder;

wherein said colouring mix has a binder content similar to or less than the binder content of said base mix and a colouring different from that of said base mix; and wherein the method further comprises, upstream of the step (c), a step of applying liquid dye or powder dye onto side walls of the one or more grooves and having a colour different from that of said base mix.

2. The method according to claim 1, characterized in that said step (b) involves the formation of one or more first grooves with a first width and one or more second grooves with a second width smaller than said first width.

3. The method according to claim 2, characterized in that said step (c) involves the distribution of a first colouring mix with a binder content similar to the binder content of said base mix in said first grooves, and the distribution of an additional colouring mix with a binder content less than that of said base mix in said second grooves.

4. The method according to claim 2, wherein the liquid dye or powder dye is applied onto side walls of the first grooves.

5. The method according to claim 1, characterized in that the veined effect across a length and a width of the slabs is of a length and a width substantially similar to veining of natural stone and/or ceramic material.

6. A robot island for the formation automatically, without human intervention, of veining in a base mix for the production of slabs of conglomerate stone and/or ceramic material, comprising:

at least one tool designed to form one or more grooves in a layer of base mix;

at least one dispensing device for distribution of a dye inside the grooves;

a plan for supporting and moving along a feeding direction a temporary support containing the base mix;

movement means associated with said at least one tool and said at least one dispensing device for the relative movement thereof above the movement plan;

wherein said at least one dispensing device when operated distributes at least one colouring mix which acts as a dye and comprises at least one binder inside said grooves;

characterized in that the robot island further comprises at least one first working head and at least one second working head mounted on said movement means, said at least one tool being mounted on said first working head and said at least one dispensing device being mounted on said second working head, and in that that said at least one dispensing device of said second head comprises a container with a bottom outlet opening for distribution, by means of gravity, of a first colouring mix inside the first grooves, the at least one dispensing device further comprising a scraper/pusher element positioned in said container for causing expulsion of the first colouring mix from the outlet opening with a substantially constant flowrate.

7. The robot island according to claim 6, further comprising at least one working head mounted on said movement means and designed to support said at least one tool and said at least one dispensing device.

8. The robot island according to claim 6, further comprising a third head comprising both a respective tool for forming second grooves in the base mix and a respective dispensing device for distributing the colouring mix inside the second grooves.

9. The robot island according to claim 8, characterized in that the at least one dispensing device of said third head comprises a hopper and a discharge duct with a feeder screw for distributing the additional colouring mix inside the second grooves.

10. The robot island according to claim 9, characterized in that said third head comprises one or more nozzles for dispensing a liquid dye and/or a liquid binder on the colouring mix which is discharged from the discharge duct.

11. The robot island according to claim 8, characterized in that said first head comprises a ploughshare tool mounted on a vertical motorized spindle and designed to oscillate in an alternating manner by means of rotation of the vertical spindle so as to vary the width of the grooves, said third head comprising a ploughshare tool mounted on a vertical motorized spindle and designed to form grooves with a width smaller than that of the grooves formed by the tool of said first head.

12. The robot island according to claim 8, further comprising a control unit connected to said first head, said second head and said third head so as to cause the displacement thereof along predetermined trajectories by the movement means.

13. The robot island according to claim 6, characterized in that said scraper element is mounted on a motorized spindle with an epicycloidal movement.

14. The robot island according to claim 6, characterized in that said at least one dispensing device comprises a closing member connected to a pneumatic actuator and positioned at said outlet opening so as to close or open the closing member selectively.

15. The robot island according to claim 6, characterized in that said second working head comprises a nozzle positioned at said outlet opening and designed to dispense a liquid dye onto the first colouring mix before the latter is distributed inside the first grooves.

16. The robot island according to claim 6, characterized in that the tool is a ploughshare tool designed to form the grooves in the base mix.

17. The robot island according to claim 6, characterized in that said first head comprises a dispensing device for applying a liquid or powder dye different from the at least one colouring mix on the side walls of the grooves.

18. The robot island according to claim 6, characterized in that said movement means comprise at least one robot with an anthropomorphic arm.

19. The robot island according to claim 6, characterized in that said movement means comprise at least one Cartesian robot.

20. An apparatus for manufacturing slabs of conglomerate stone and/or ceramic material with a veined effect from a base mix, comprising:

a machine for depositing a layer of base mix inside a temporary support;

a robot island for the formation of veining in the layer of base mix;

a machine for compacting the layer of base mix contained inside the temporary support and having the veining;

a line for transporting the temporary support;

characterized in that the robot island for forming the veining is of the type according to claim 7.

21. The robot island according to claim 6, characterized in that said at least one colouring mix has a binder content similar to or less than the binder content of said base mix.

22. The robot island according to claim 6, characterized in that said at least one colouring mix has a colouring different from that of said base mix.

* * * * *